Sept. 26, 1967 C. W. LEVANG ET AL 3,343,291

TELEPHONE ACCESSORY

Filed Dec. 1, 1965 2 Sheets-Sheet 1

INVENTORS
CARMEN W. LEVANG
NEIL D. DAHL

BY Sherman Levy
ATTORNEY

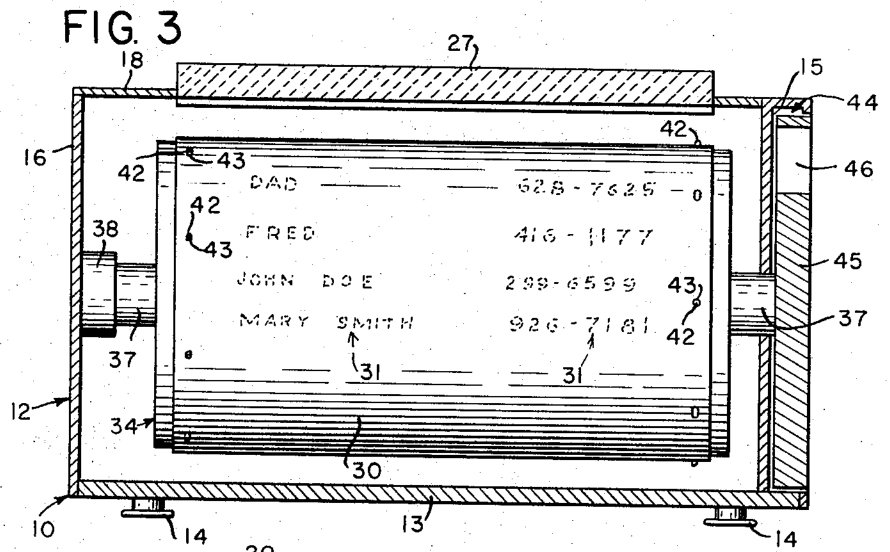
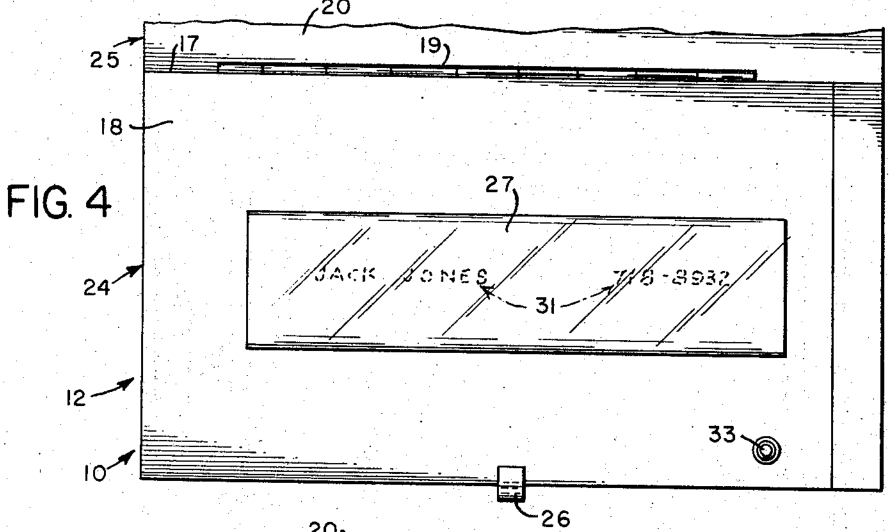
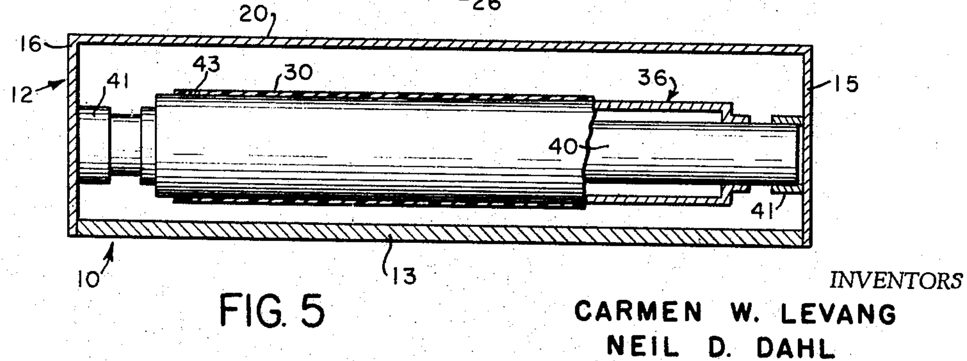
FIG. 5
INVENTORS
CARMEN W. LEVANG
NEIL D. DAHL
BY Sherman Levy
ATTORNEY 3,343,291
TELEPHONE ACCESSORY
Carmen W. Levang, 11241 14th Ave. SW., Seattle, Wash. 98146, and Neil D. Dahl, Watford City, N. Dak. 58854
Filed Dec. 1, 1965, Ser. No. 510,830
1 Claim. (Cl. 40—96)

ABSTRACT OF THE DISCLOSURE

A telephone accessory for holding indicia such as a plurality of names and telephone numbers, and wherein there is provided a manually operable means to permit a user to conveniently locate a desired phone number.

This invention relates to a telephone accessory, and more particularly to a device for conveniently holding indicia thereon such as a plurality of names and telephone numbers.

The primary object of this invention is to provide a telephone accessory which consists of a member that is adapted to be arranged contiguous to a telephone, and wherein there is provided a manually operable means for moving a belt which has a plurality of names and phone numbers thereon so that the user can conveniently and readily ascertain or locate a desired phone number with ease or facility.

A further object is to provide a device of the type stated that includes a viewing member or magnifying glass for permitting the names and phone numbers to be read or observed with ease, and wherein there is also provided a magnetic means for selectively maintaining the device in place adjacent to a telephone, and wherein the present invention is constructed so that there will be no interference with normal use of the telephone.

Still another object is to provide such a telephone accessory that is economical to manufacture and efficient in operation and which is operable by one hand of the operator, and wherein the device is both rugged in structure and foolproof in use.

These and other objects of the invention will become apparent from a reading of the following specification and claim, together with the accompanying drawing, wherein like parts are referred to and indicated by like reference characters and wherein:

FIGURE 3 is a sectional view taken on the line 3—3 of FIGURE 2.

FIGURE 4 is an enlarged fragmentary top plan view of the present invention.

FIGURE 5 is a sectional view taken on the line 5—5 of FIGURE 2.

Figures 1, 2:
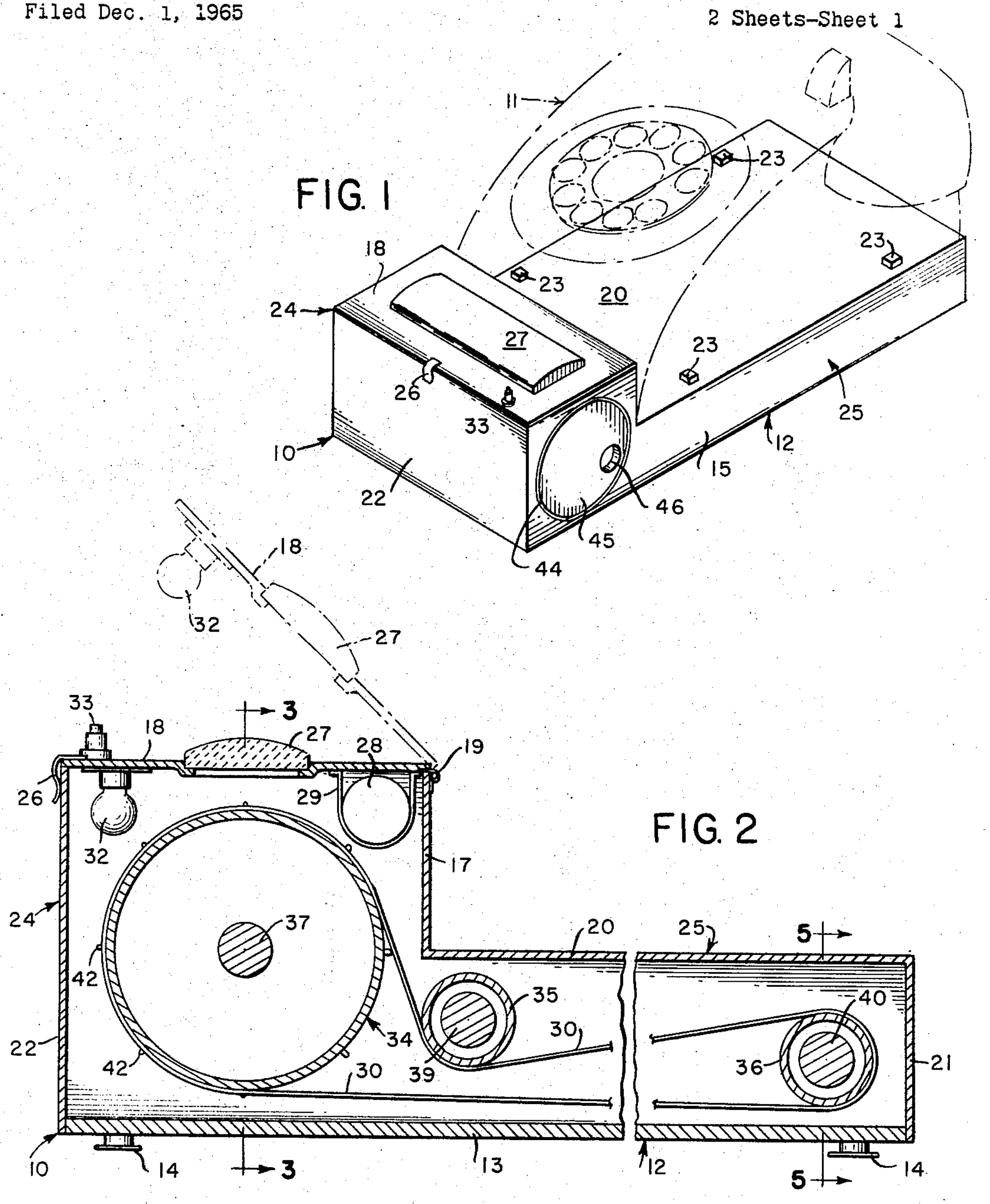
FIGURE 1 is a perspective view illustrating the telephone accessory of the present invention.
FIGURE 2 is an enlarged vertical sectional view taken through the telephone accessory.

Referring in detail to the drawings, the numeral 10 indicates the accessory of the present invention which is adapted to be used with a conventional telephone that is indicated by the numeral 11, FIGURE 1. The accessory 10 includes a hollow housing or casing that is indicated generally by the numeral 12, and housing 12 comprises a horizontally disposed bottom wall 13 which may have a plurality of feet or lugs 14 depending therefrom, FIGURE 2. As shown in FIGURE 3, for example, the housing 12 further includes spaced parallel vertically disposed side walls 15 and 16. There is further provided a vertically disposed wall portion 17, FIGURE 2, and the numeral 18 indicates a top member that is hingedly connected to the upper portion of the wall 17 by means of a hinge 19. The housing 12 further includes a horizontally disposed top wall portion 20, and there is further provided spaced apart vertically disposed end walls 21 and 22, FIGURE 2. The numeral 23 indicates magnets which are suitably affixed to or mounted on the wall 20, and the magnets 23 are adapted to selectively engage the lower base plate of the telephone 11 so that the accessory 10 will remain immobile or stationary with respect to the telephone. This previously described construction of the housing 12 defines or provides a forwardly disposed generally enlarged section 24 as well as a rearwardly disposed section 25, and when the device is being used as shown in FIGURE 1, the telephone 11 is adapted to rest on or be supported on the section 25 so that an end portion of the telephone 11 abuts the wall portion 17. In this way there is no interference with normal use of the telephone and in addition the telephone is stabilized on the accessory of the present invention and the parts are arranged so that use of the accessory can be accomplished in the most advantageous and convenient manner.

The numeral 26 indicates a latch for selectively maintaining the top member 18 in closed position on the housing as shown in FIGURE 2. A magnifying glass or viewing member 27 is suitably connected to the top member 18 so as to facilitate reading of the indicia such as the indicia 31 on the belt 30 that is arranged within the housing 12. The numeral 32 indicates a small light that is adapted to be carried by the top member 18, and the light 32 is adapted to be electrically connected to one or more batteries 28 which are adapted to be arranged in a convenient location such as adjacent the undersurface of the top member 18, and the battery 28 may be held in place by a suitable clamp or bracket 29. The numeral 33 indicates a manually operable light switch which is adapted to be electrically connected into the circuit with the light 32 and battery 28 so that by properly manually actuating the switch 33, the light 32 can be turned on or off in order to illuminate the interior of the housing 12 so as to facilitate the reading of the indicia 31 on the belt 30 through the magnifying glass 27 when desired or required.

Arranged within the hollow housing 12 is a plurality of rollers 34, 35 and 36. The roller 34 is adapted to be of larger diameter than the rollers 35 and 36, and the roller 34 is adapted to be arranged within the enlarged section 24. As shown in FIGURE 2, the rollers 35 and 36 may be arranged within the section 25 of the housing. The roller or drum 34 has a shaft 37 extending therethrough and connected thereto, and the ends of the shaft 37 may be journalled in bearings 38 which are suitably mounted in the housing. The rollers 35 and 36 have shafts 39 and 40, respectively, extending therethrough, and these shafts 39 and 40 are also adapted to have their ends journalled in bearings such as the bearings 41. The continuous or endless belt 30 is adapted to be arranged as shown in FIGURE 2 so that it extends around the roller 34 and below the roller 35 and around the roller or drum 36.

There is provided on the roller 34 adjacent the outer ends thereof, rows or sets of staggered teeth or projections 42, and these teeth 42 are adapted to selectively register with and project through apertures or openings 43 that are arranged in corresponding staggered formation adjacent the outer side edges of the continuous belt 30 so that a positive drive arrangement is provided for the belt 30.

As shown in FIGURE 3, the enlarged section 24 of the housing 12 is provided with a recessed or indented area 44, and the numeral 45 indicates a manually rotatable wheel or disk which is rotatably positioned within the recessed area 44, and the wheel 45 is suitably secured to an end of the shaft 37. The wheel or disk 45 is provided with an opening or hole 46 for the reception of a finger so as to facilitate manual turning or rotation of the wheel 45 so that the belt 30 can be shifted or moved in order to bring the desired portion of the belt with the desired indicia or information thereon in position below the magnifying glass 27 to permit such information as the telephone number of a person to be readily observed or ascertained.

From the foregoing, it will be apparent that there has been provided a telephone accessory which is especially suitable and convenient for holding a plurality of names and phone numbers so that, for example, phone numbers of persons or organizations that are frequently dialed or called, can be easily and quickly located or determined. In use, with the parts arranged as shown in the drawings, the device or member 10 is adapted to be positioned so that the telephone 11 is supported on the section 25, and with the telephone abutting the upstanding wall portion 17. The magnets 23 on the wall 20 are adapted to engage and coact with the metal base plate on the lower surface of the telephone 11 so that the member 10 and telephone 11 will be maintained properly held together. The belt 30 has the rows of staggered apertures or openings 43 adjacent its outer edges, and the teeth 42 on the drum or roller 34 are adapted to extend through these apertures 43, the teeth 42 being arranged in staggered relation.

When the present invention is being used, the switch 33 can be manually actuated to cause the light 32 to be illuminated by electrical energy from the battery 28. Then, it is only necessary to manually rotate the wheel or disk 45 as for example by inserting a finger into the opening 46 in the wheel 45 and the wheel 45 is conveniently arranged within the recessed area 44 as shown in the drawings. As the wheel 45 is rotated, it turns the shaft 37, and with the roller 34 affixed to the shaft 37, it will be seen that this will result in rotation of the roller 34 which in turn will move the belt 30. Due to the interengagement of the staggered teeth 42 with the apertures 43, there will be a positive drive for the belt 30, and the belt 30 is adapted to have a plurality of names and corresponding phone numbers, as indicated by the numeral 31, FIGURE 3, thereon. Thus, the belt 30 can be moved or shifted so that a desired name and phone number is in registry below the magnifying glass 27, as for example as shown in FIGURE 4, and the user can then quickly and readily read the name and phone number through the magnifying glass 27. This number can then be conveniently dialed on the telephone 11 and the parts are arranged so that there will be no interference with normal use of the telephone.

The feet 14 may be provided to support the device 10 at a convenient location above a desk or other supporting structure.

As shown in FIGURE 2, the lid or top member 18 can be raised or pivoted upwardly about an axis extending through the hinge 19 so that if it becomes necessary to replace the battery 28, or bulb 32, or if it becomes necessary to change the indicia on the belt 30, a means is provided for gaining access to the interior of the housing 12. The raised position of the top member 18 is illustrated by dotted lines in FIGURE 2. The latch 26 serves to selectively maintain the member 18 in closed position during normal use of the device.

The rollers 35 and 36 function as guide rollers or guide members for the belt 30 and these rollers as well as the roller 34 are rotatable so that the belt 30 will move in the desired manner as the wheel 45 is rotated or manually moved.

The parts can be made of any suitable material and in different shapes or sizes as desired or required.

The present invention will eliminate out-dated phone indexes, scraps of paper and the like, and the present invention is in the nature or form of a compact, sturdy, decorator designed unit to provide immediate access to a plurality of phone numbers. In use it is only necessary to move the belt until the person and number wanted is below the viewing window 27 so that the number can be readily observed. The device can be made with attractive colors to match modern phone colors. The belt 30 can be made of a suitable material, such as a suitable plastic, so that it will not shrink or stretch, and will be durable. The device includes the recessed dialing wheel 45 which is exposed on the outside of the housing. The top 18 is adapted to be opened as for example when additional names are to be written or placed on the belt. The continuous belt 30 is adapted to hold a plurality of names and numbers and, for example, may be made so that it accommodates or holds 50 to 60 names and phone numbers or the like. The names can be arranged alphabetically if desired. An important feature or aspect of the present invention is the belt drive with the positive drive mechanism including the interfitting staggered teeth 42 and staggered openings 43. Because the unit is mounted under the phone, it will be attractive and handy and is especially useful for modern-day telephones. The device can be made and packaged as an attractive item for gift merchandising. The device can be made in several different models, namely a deluxe model containing a battery powered light, and a standard model which would be less expensive. The magnifying glass 27 can be read at an angle for easier viewing. The magnetic blocks or elements 23 serve to hold the device in position at all times and need not be removed in the event additions are to be made to the list. The positive non-slip sprocket drive belt, made of durable plastic, is superior to paper roller devices and the like.

As shown in FIGURE 3, the wheel 45 is positioned in the recess 44 so that the outer surface of the wheel is flush with the side of the housing. The staggered teeth and apertures provide positive traction. Slots can be arranged in the frame for installation of a roller such as the roller 34. The finger hole 46 in the wheel insures fast selection. A starting line can be arranged on the belt to get the belt started straight or in the proper manner.

The present invention is compact, neat, and attractive and provides a handy reference item as for example when a person wishes to quickly call a business associate, friend or the like. The device will give finger-tip reference to a plurality of alphabetically arranged names and phone numbers by means of a finger-tip dial selector, and the device will always be in place because the telephone sits on top of the device. FIGURE 1 illustrates a standard model for use with one type of telephone, but the device can also be made to fit a wall telephone as well as the new "Princess" style phone. The frame or housing can be made of a suitable material such as a suitable plastic.

It is to be noted that the present invention will also work on or in conjunction with the new phones, such as those utilizing the new dialing system, with the key punch method rather than the old circular dial.

Also the present invention is adapted to use a sheet of paper with a gummed back that one could type on or print before it is inserted on the plastic belt. If the paper becomes soiled the old one can be taken off and a new one applied.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

In a telephone accessory, a hollow housing embodying a horizontally disposed bottom wall having a plurality of lugs depending therefrom, said housing further embodying spaced parallel vertically disposed side walls, a top wall portion, and spaced apart end walls, a vertically disposed wall portion, a top member hingedly connected to said wall portion, a latch for selectively maintaining the top member in closed position on the housing, a viewing member connected to said top member, magnets on said top wall portion, said magnets adapted to selectively engage the lower base plate of a telephone, a manually operable light switch connected to the top member, a light bulb depending from the top member, a source of electrical energy embodying at least one battery in said housing adjacent the undersurface of the top member; the walls and said top member of the housing defining and providing a forwardly disposed generally enlarged section, and a rearwardly disposed section so that when the accessory is being used a telephone will rest on the rearwardly disposed section with an end portion of a telephone abutting the vertically disposed wall portion of the housing; first, second, and third rollers mounted in said housing, and said rollers being arranged in spaced parallel relation with respect to each other, said first roller being of greater diameter than said second and third rollers, said first roller being arranged in the enlarged section of the housing and said second and third rollers being arranged in the rearwardly disposed section of the housing, shafts fixedly connected to said rollers, rows of staggered teeth on said first roller adjacent the ends thereof, a continuous belt having indicia thereon, said belt extending around the first roller and below the second roller and around the third roller, and said belt having rows of staggered apertures adjacent the outer edges thereof for receiving and coacting with said teeth so that a positive drive is provided for the belt, there being a recess in the enlarged section of the housing adjacent the first roller, a manually operable wheel mounted in said recess and connected to the shaft having the first roller thereon, and a finger engaging hole in said wheel, said wheel being positioned in the recess so that the outer surface of the wheel is flush with the side of the housing.

References Cited

UNITED STATES PATENTS

| | | | |
|---|---|---|---|
| 835,844 | 11/1906 | Bewan. | |
| 1,398,771 | 11/1921 | Clarke | 40—96 X |
| 1,710,207 | 4/1929 | Cook | 40—86 |
| 2,116,507 | 5/1938 | Colin | 40—31 |
| 2,846,159 | 8/1958 | Reynolds | 40—31 X |
| 3,195,242 | 7/1965 | Ward et al. | 40—86 X |
| 3,286,388 | 11/1966 | Makiri | 40—336 |
| 3,292,289 | 12/1966 | Fuhr | 40—96 |

FOREIGN PATENTS

| | | |
|---|---|---|
| 664,953 | 4/1929 | France. |
| 823,078 | 10/1937 | France. |

EUGENE R. CAPOZIO, *Primary Examiner.*

R. CARTER, *Assistant Examiner.*